United States Patent [19]

Lochte et al.

[11] 4,350,371

[45] Sep. 21, 1982

[54] SUBSEA PIPE CONNECTOR

[75] Inventors: Glen E. Lochte, Houston; Jackie R. Allen, Porter, both of Tex.

[73] Assignee: FMC Corporation, Chicago, Ill.

[21] Appl. No.: 135,849

[22] Filed: Mar. 31, 1980

[30] Foreign Application Priority Data

Apr. 2, 1979 [GB] United Kingdom ............... 7911437

[51] Int. Cl.³ .......................................... F16L 41/00
[52] U.S. Cl. ...................................... 285/18; 285/158; 285/321; 166/120
[58] Field of Search .................... 285/18, 24, 27, 190, 285/321, 158; 166/120

[56] References Cited

U.S. PATENT DOCUMENTS

| | | | |
|---|---|---|---|
| 836,989 | 11/1906 | Oliver | 285/190 |
| 1,206,563 | 11/1916 | McConnell | 285/190 X |
| 3,251,611 | 5/1966 | Haeber et al. | 285/18 |
| 3,729,941 | 5/1973 | Rochelle | 285/24 X |
| 3,744,822 | 7/1973 | Arnold | 285/18 |
| 3,829,134 | 8/1974 | Hutchison | 285/190 X |
| 3,977,702 | 8/1976 | White, Sr. et al. | 285/18 |
| 4,046,405 | 9/1977 | Bonds | 285/321 X |

FOREIGN PATENT DOCUMENTS 251327 9/1912 Fed. Rep. of Germany ...... 285/190

*Primary Examiner*—Thomas F. Callaghan
*Attorney, Agent, or Firm*—Lloyd B. Guernsey; W. W. Ritt, Jr.

[57] ABSTRACT

An improved pipe connector especially adapted for connecting subsea pipes includes a dart-shaped assembly that can be installed and sealed in a cylindrical housing to establish a fluid-tight connection between the assembly and the housing using a minimum of diver assistance. The connector housing includes an axial passage to receive the assembly, and an annular groove in the inner wall of the axial passage. The assembly includes a bore extending axially from one end thereof through a portion of the assembly, and a port extending radially from the axial bore through the wall of the assembly to the groove of the housing when the assembly is positioned in the housing. Another passage extends radially from the groove to the outside of the housing. A pair of annular resilient packing rings mounted between the assembly and the housing provide fluid-tight seals for fluid flow from the axial bore of the assembly through the radial port and the annular groove out through the radial passage in the housing. Means are provided for selectively locking and unlocking the assembly in the housing and for setting and releasing the resilient packing rings.

10 Claims, 8 Drawing Figures

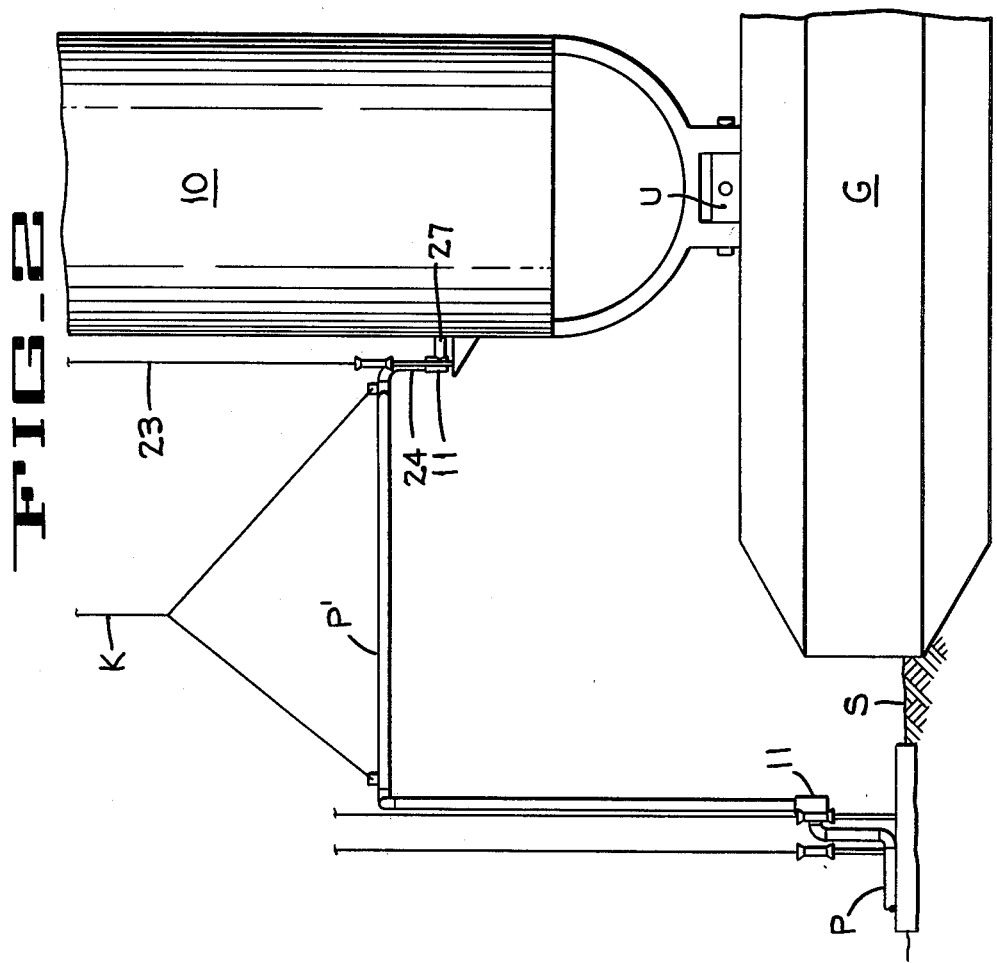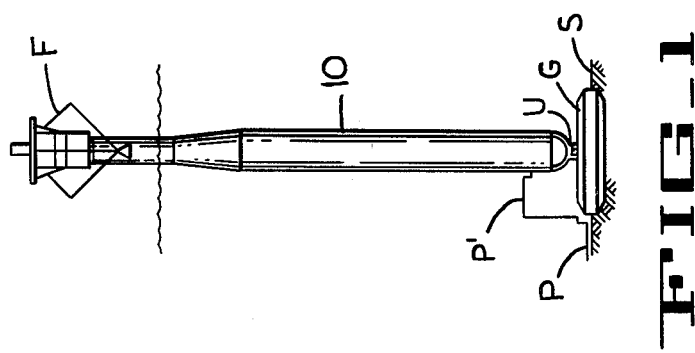

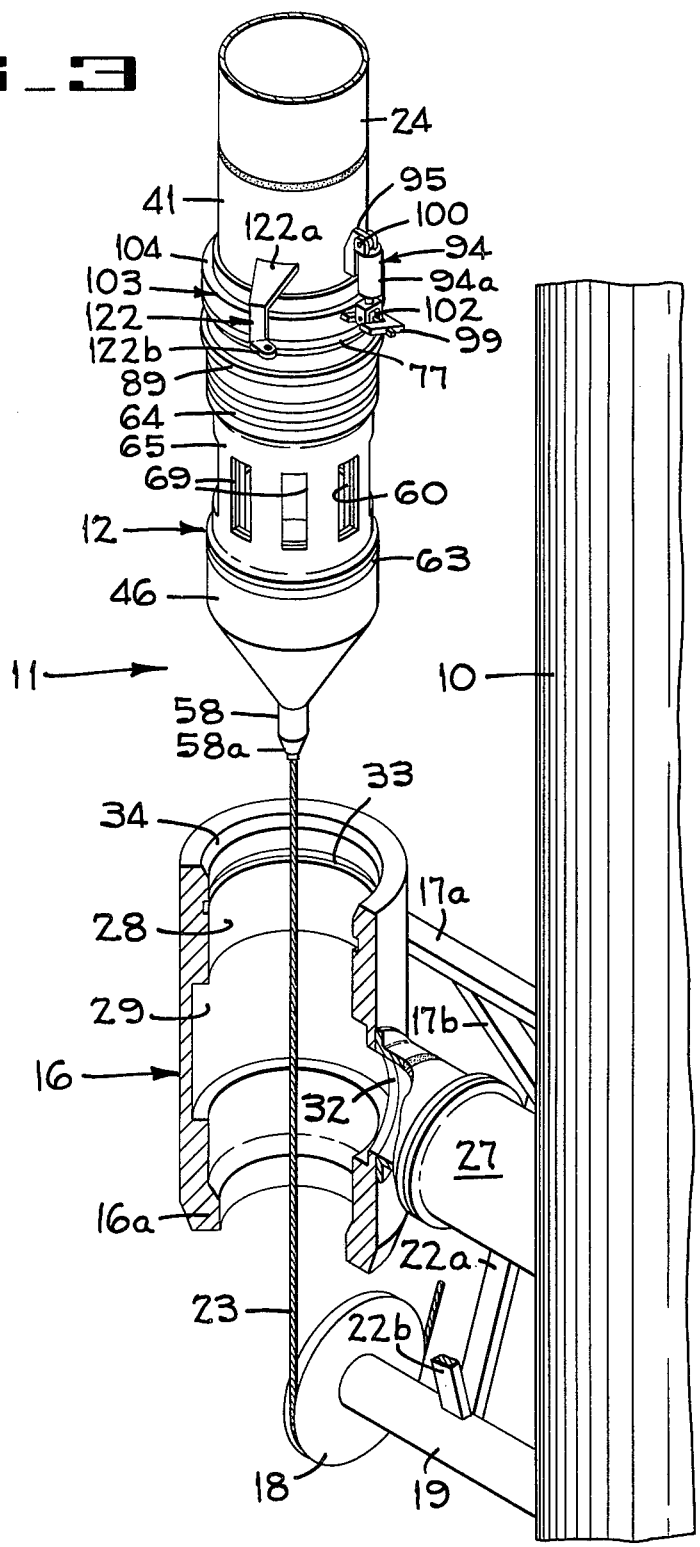

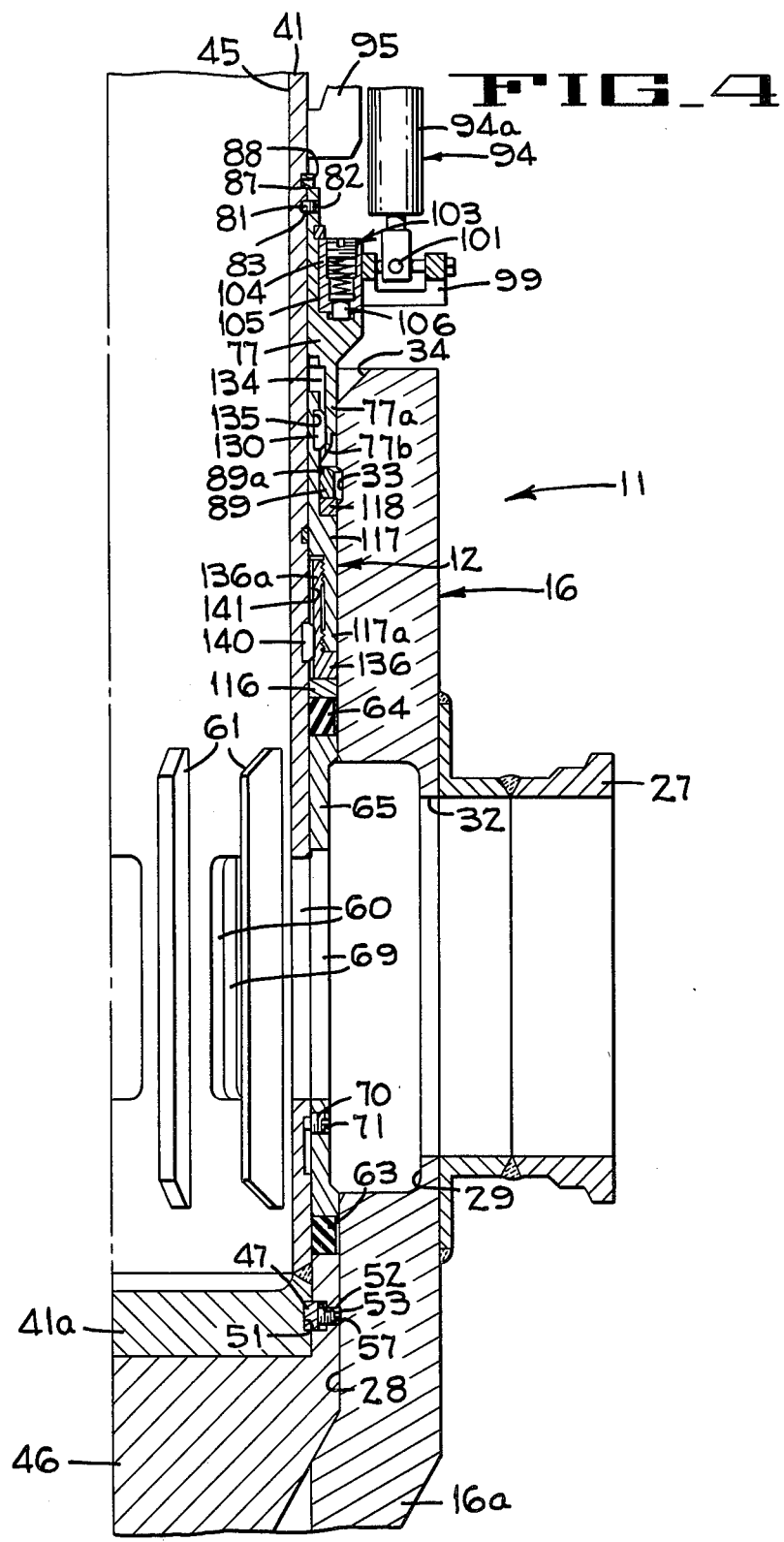

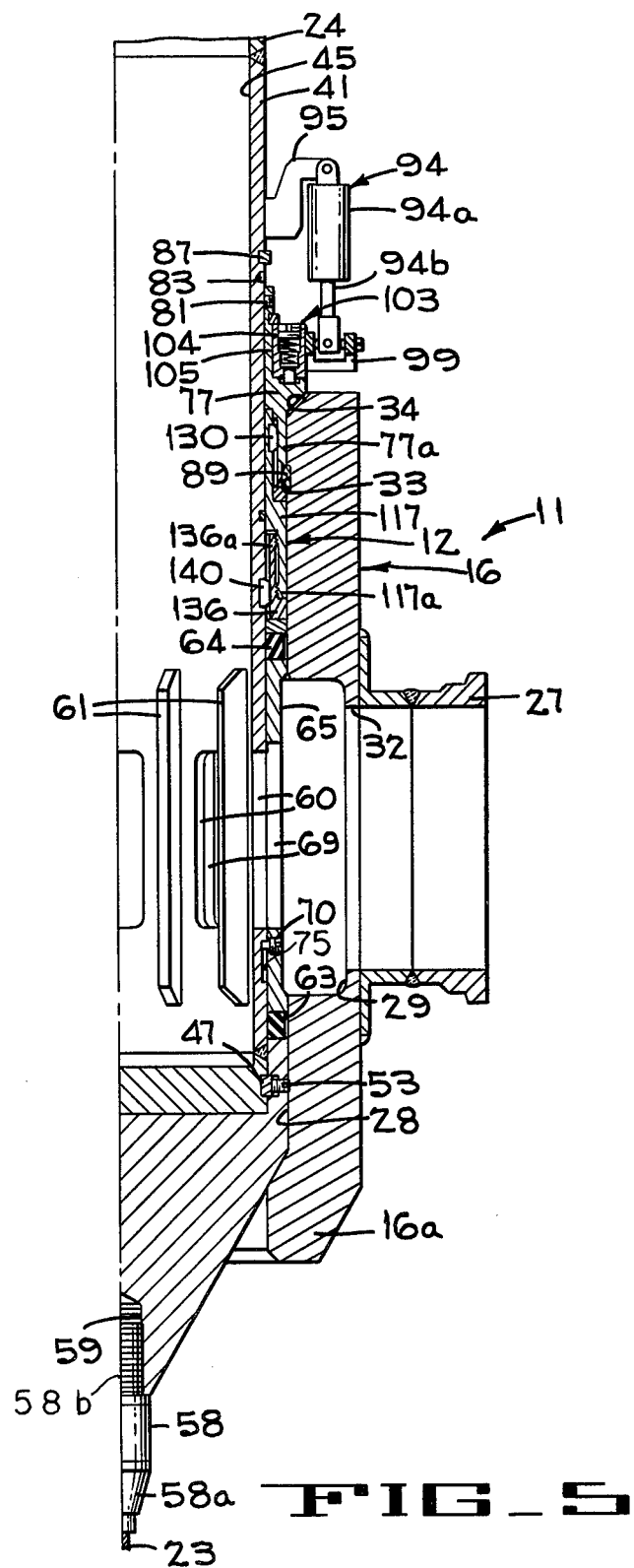

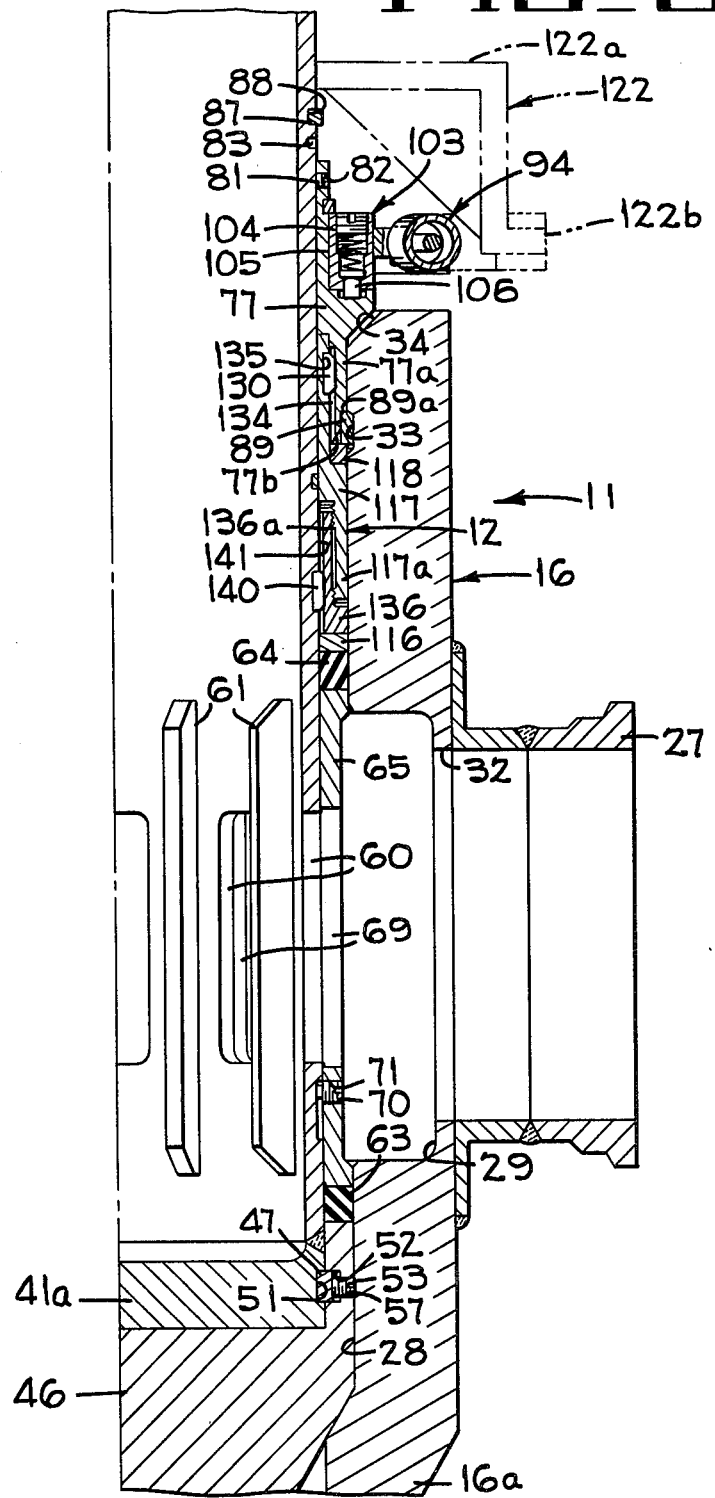

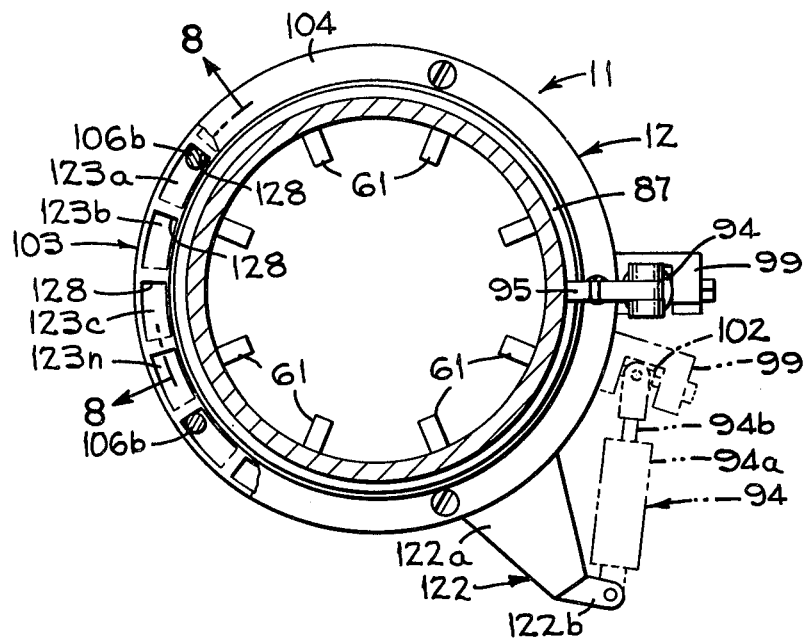
FIG_7
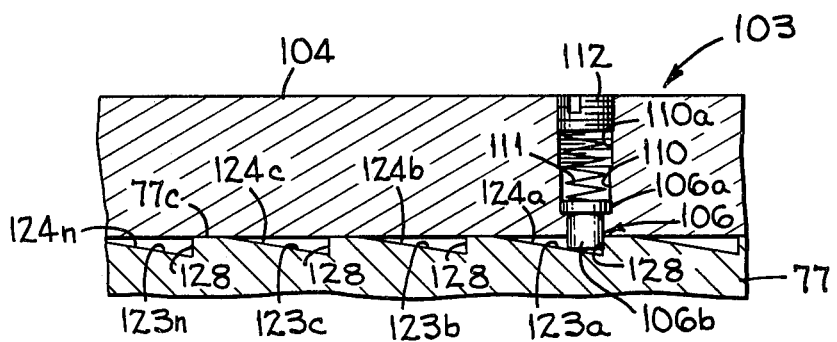
FIG_8

SUBSEA PIPE CONNECTOR

BACKGROUND OF THE INVENTION

1. Field of the Invention

This invention relates to subsea pipe connectors, and more particularly to a connector which joins two fluid lines using a minimum of diver assistance.

2. Description of the Prior Art

A production of oil and gas from offshore wells is a common endeavor in the petroleum industry. A well or cluster of several wells is drilled in the ocean floor and fluid from these wells transported by conduit to one or more storage reservoirs for collection and transfer to marine tankers which transport the fluid to shore facilities. A system of pipelines convey the fluid from the storage reservoir to a platform or floating buoy to which a marine tanker may be attached. The pipeline system includes a pipe or conduit extending generally horizontally along the ocean floor from the storage reservoir to a point below the floating buoy and a generally vertical pipe extending from the buoy to the horizontal pipe. At a plurality of locations in the pipeline system connections are needed between the various pipes. Such connections are difficult to complete in the hostile environment of the ocean where it is often a formidable task to align a pair of pipes and move them to fluid-tight connection. Other pipe connectors are employed to complete connection in hydraulic lines leading from a surface control center to hydraulic valve operators located in subsea wellheads. In prior art systems, pipe connectors having metal seals are often used. In such connectors the connecting surfaces must be relatively free from scratches or other imperfections and must be precisely aligned in order to complete, and prevent leakage of fluid from, the connection.

What is needed is a connector which has parts that can be easily moved into a fluid-tight relationship, and which is tolerant of small imperfections in the connecting surfaces and of small degrees of misalignment between the sealing surfaces.

SUMMARY OF THE INVENTION

The present invention comprises a subsea connector for releasably connecting two lengths of pipe while using a minimum of diver assistance. This invention overcomes some of the disadvantages of the prior art by employing a generally cylindrical outer connecting member having an axially extending passage to receive a generally cylindrical inner connecting member. Approximately midway along the length of the axial passage is an annular groove in the wall of the outer connecting member, and a radially extending passage through the wall connects the annular groove with the outside of the outer connecting member.

The inner connecting member includes an axial bore extending from one end of the inner member, a portion of the way through the center of the inner member. One or more ports extend radially from the axial bore of the inner member to a point radially adjacent the annular groove of the outer member when the inner member is positioned inside the axial passage of the outer member. A pair of expandable annular sealing members, located between the inner and outer connecting members, are positioned with one sealing member on each side of the groove, to provide a pair of fluid-tight seals to facilitate transfer of fluid from the axial bore of the inner member, through the radial port of the inner member into the groove of the outer member, and out the radial passage to the outside of the outer member. Pipes are connected to the radial passage of the outer member and to the axial bore of the inner member. A releasable locking means secures the inner member in position inside the outer member. A conventional hydraulic actuator operates the locking means and sets the sealing members by first moving a setting ring in an axial direction to lock the inner and outer members together, and then rotating the setting ring to set the sealing members into a fluid-tight connection. The expandable sealing member compensates for some degree of misalignment of the inner and the outer connecting members and for minor imperfections in the surface of the connecting members, while providing fluid-tight seals.

BRIEF DESCRIPTION OF THE DRAWINGS

FIG. 1 is a side elevation of an offshore fluid transfer terminal with a loading arm mounted on a buoyant vertical column, and with one or more connectors of the present invention used to connect a subsea pipe line extending from the vertical column to a source of petroleum or other fluid product.

FIG. 2 is an enlarged view of a portion of the fluid transfer terminal of FIG. 1, showing the connectors of the present invention.

FIG. 3 is an isometric view of an improved pipe connector according to the present invention, with the inner and outer connecting members separated.

FIGS. 4–6 are enlarged vertical sections of the pipe connector showing the various steps of connecting the inner and outer members.

FIG. 7 is a horizontal section of the pipe connector of FIG. 4.

FIG. 8 is a vertical section taken along the line 8—8 of FIG. 7.

DESCRIPTION OF THE PREFERRED EMBODIMENT

FIG. 1 diagrammatically illustrates an improved subsea connector for interconnecting a pair of pipes or conduit using a minimum of diver assistance, as employed with a buoyant articulated column 10 pivotally connected to a subsea base G by a universal joint U. A pipeline P extending from a source of fluid (not shown) along the seafloor S to the column 10 includes a plurality of connectors 11 of the present invention. A vertical pipeline (not shown) extends from the pipeline P upward through the column to an articulated loading arm F for transferring fluid from the column to marine tankers which may be positioned near the column 10. A connecting portion P' of the pipeline P can be lowered into position for connection to the connectors 11 by a support cable K.

Each of the pipe connectors 11 includes an assembly or inner member 12 and an outer member or housing 16 (FIGS. 3–6) connected to the articulated column 10 by a plurality of brackets 17a,17b. A pulley 18, rotatably connected to the column by a housing 19 and a pair of brackets 22a,22b, and a pull-in cable 23, connected to the lower end of the inner member 12 facilitate pulling the inner member into operating position inside the outer member 16. A pipe 24 extends upward from the inner member 12 for connecting to a fluid source or storage facility (not shown) to provide fluid which flows through the connector 11 and though a pipe 27 connected between the articulated column 10 and the outer member 16.

The outer member 16 (FIG. 3) includes an axially extending passage 28 to receive the inner member 12 in position to transfer fluid between the pipes 24 and 27. Approximately midway along the length of the axial passage 28 is an annular groove 29 (FIGS. 3-6) in the wall of the outer connecting member 16, and a radially extending passage 32 which connects the groove 29 with the pipe 27. The lower end of the outer member 16 includes a radial inward flange 16a (FIGS. 3-6) to limit the downward travel of the inner member 12 inside the axial passage 28 of the outer member 16. A second annular groove 33 in the wall of the outer member 16 aids in locking the inner member 12 inside the axial passage 28 as will be further described hereinafter, and a cam surface 34 at the upper end of member 16 facilitates moving the inner member 12 into the axial passage 28.

The dart-shaped inner member 12 comprises a tubular mandrel 41 (FIGS. 3-6) having a bore 45 (FIGS. 4-6) extending axially through the central portion of the mandrel and communicating with the pipe 24. A closed lower end 41a of the mandrel is releasably connected to a generally cone-shaped pulling head 46 (FIGS. 4-6) by an annular latching ring 47 mounted in an annular groove 51 in the mandrel 41 and in an annular groove 52 in the pulling head 46. The ring 47 is biased radially outward into the groove 52 where the ring is positioned until it is moved radially inward into a locking position by a plurality of set screws 53 (only one being shown in FIGS. 4-6), each of which is mounted in a threaded hole 57. A swivel member 58 (FIGS. 3, 5), having the lower end 58a thereof swivelly attached to the cable 23 and having a threaded upper portion 58b, is removably mounted in a threaded bore 59 in the pulling head 46. The mid-portion of the inner member 12 includes a plurality of spaced ports 60 (FIGS. 3-6) extending radially through the wall of the mandrel 41, and a plurality of reinforcing ribs 61 (FIGS. 4-7) spaced around the inner wall of the mandrel 41 between the ports 60.

A pair of annular resilient packing rings 63,64 (FIGS. 3-6) surround the mandrel 41 and the rings are axially spaced along the mandrel at either end of an annular lantern ring 65 surrounding the mandrel and having a plurality of circumferentially spaced ports 69. The axial movement of the lantern ring along the mandrel 41 is limited by one or more setscrews 70 each mounted in a threaded bore 71 in the lantern ring 65 and having the radially inward end of the setscrew slidably mounted in a groove 75 (FIG. 5) in the mandrel 41. The resilient packing rings 63,64 are compressed axially and expanded radially against the outer member 16 by a radially movable compression means which includes an annular setting ring 77 having a ring skirt 77a extending radially downward (FIGS. 4-6) between the outer member 16 and the mandrel 41. To facilitate moving the mandrel 41 into the outer member 16, the setting ring 77 is held in the "unlocked" position (FIG. 4) by a threaded shear pin 81 mounted in a threaded bore 82 in the ring 77 and extending into a shallow bore 83 in the mandrel 41. When the shear pin is broken, the upward travel of the setting ring 77 is limited by an annular retaining ring 87 mounted in an annular groove 88 in the mandrel 41. The lower end of the skirt 77a includes a cam surface 77b which cooperates with a cam surface 89a to move an annular locking ring 89 radially outward into the annular groove 33, thereby to lock the mandrel 41 to the outer member 16 when the shear pin 81 is broken and the setting ring 77 is moved axially downward from the unlocked position shown in FIG. 4 to the locked position shown in FIG. 5.

Axial movement of the setting ring 77 is provided by one or more hydraulic rams 94 (FIGS. 3-7), each of which is connected between a pair of brackets 95,99. The body 94a of the hydraulic ram is removably connected to the upper bracket 95 by a pin 100, and piston rod 94b of the hydraulic ram is secured to the lower bracket 99 by a universal joint 102 and by a pin 101. The bracket 95 is welded or otherwise connected to the mandrel 41, and the bracket 99 is welded or otherwise connected to an annular ratchet head 103 mounted adjacent the setting ring 77. When the hydraulic ram 94 is extended the pin 81 shears and allows the setting ring 77 to move axially downward (FIGS. 4-6) to expand the locking ring 89 radially outward into the locked position shown in FIG. 5. The weight of the setting ring 77 and the ratchet head 103, and the friction between the mandrel 71 and the setting ring 77, retains the setting ring in the position shown in FIG. 5 during subsequent operations.

The skirt portion 77a (FIGS. 4-6) of the setting ring 77 is coupled to an annular actuator 117 by a key 130 slidably positioned in an axial slot 134 in the setting ring and fixed in a slot 135 in the actuator 117. The key 130 locks the actuator 117 to the setting ring 77 so that the actuator rotates as the setting ring is rotated but leaves the ring 77 free to move axially relative to the actuator 117. A lower portion 117a of the actuator 117 is threaded to an upper portion 136a of an annular compression ring 136 to move the ring 136 in an axial direction as the actuator is rotated. A key 140, fixed to the mandrel 41 and slidably mounted in an axial slot 141 in the compression ring 136, prevents the compression ring from rotating about the mandrel.

The ratchet head 103 includes an annular ratchet ring 104 (FIGS. 3-8) having an axial bore 105 to receive the upper portion of the setting ring 77. The ratchet head includes one or more lugs 106 (FIGS. 4-6, 8) having a flange 106a (FIG. 8) on the upper end thereof, and having a body portion 106b mounted in a bore 110 of the ring 104. A spring 111 and an adjusting nut 112, mounted in an enlarged threaded upper portion 110a of the bore 110, bias the lug in a downward direction. The ratchet head 103 and the setting ring 77 cooperate with an annular cam ring 116, the annular elongated actuator 117, an annular ring 118, and the lantern ring 65 to radially expand the resilient packing rings 63,64 and provide a pair of fluid-tight seals between the mandrel 41 and the outer member 16. Power to set the sealing rings 63,64 is obtained by disconnecting the ram 94 from the bracket 95 where it is mounted in a generally vertical position between the eye brackets 95,99, as shown in FIGS. 3-5, and then connecting it to the outer end of a radially extending eye bracket 122 (FIGS. 6,7) so that it resides in a generally horizontal position. The upper end 122a of the bracket 122 (FIGS. 3,7) is welded or otherwise connected to the mandrel 41, and the lower end 122b of the bracket 122 extends downward to a plane in which the bracket 99 is connected to the ratchet ring 104. Extending the piston rod of the ram 94 (FIG. 7) causes the bracket 99 and the ratchet ring 104 to rotate couterclockwise and cause the lug 106 to move into one of a plurality of holes 123a-123n (FIGS. 7,8) circumferentially spaced about the setting ring 77. Each hole 123a-123n includes a tapered bottom cam surface 124a–124n extending upward from a point adjacent a shoulder 128 to an upper surface 77c of the setting ring 77.

The ratchet head 103, setting ring 77, actuator 117, and compression ring 136 cooperate to move the annular ring 116 axially against the packing ring 64 (FIGS. 4–6) to squeeze the packing ring between the ring 116 and the upper end of the lantern ring 65 thereby causing the packing ring 64 to expand radially and to provide a fluid-tight seal between the mandrel 41 and the outer member 16. Downward pressure on the lantern ring 65 by the packing ring 64 also presses the lower end of the lantern ring against the packing ring 63 and squeezes it between the lantern ring and the upper end of the skirt 46a of the pulling head 46, causing the packing ring 63 to expand radially and provide a fluid-tight seal between the lower portion of the mandrel 41 and the outer member 16.

The sealing rings 63,64 are set by alternately extending and retracting the piston rod of the ram 94 while the ram is connected between the brackets 99, 122. At each retraction the bracket 99 moves from the position shown in the solid lines of FIG. 7 to the position shown in the phantom lines, causing the bracket 99 and the ratchet ring 104 to rotate counterclockwise about the mandrel 41. When the ratchet ring 104 rotates counterclockwise, the lug 106 of the ratchet head presses against a shoulder 128 of the tapered hole 123a and rotates the setting ring 77 and the actuator 117 counterclockwise. The compression ring 136 is prevented from rotating by the key 140, so the threads on the lower portion 117a of the rotating actuator 117 react with the threads on the upper portion 136a of the non-rotating compression ring 136 to force the compression ring axially downward against the ring 116, squeezing the packing ring 64 against the lantern ring 65 and radially expanding the packing ring 64 as shown in FIG. 6. The packing ring 63 is compressed between the skirt 46a of the pulling head 46 and the lower end of the lantern ring to radially expand the packing ring 63 as explained hereinbefore.

When the piston rod of the hydraulic ram 94 is extended the bracket 99 and the ratchet ring 104 rotate clockwise about the mandrel 41, causing the lug 106 (FIG. 8) of the ratchet head to slide along the sloping cam surface 124a, out of the ratchet hole 123a, over the surface 77c, and into an adjacent hole 123b. A subsequent retraction of the ram's piston rod again rotates the ratchet head 103 counterclockwise about the mandrel 41 and further compresses the packing rings 63,64. This sequence continues until the rings 63,64 form fluid-tight seals above and below the ports 60 of the mandrel 41.

The inner member 12 is released from the outer member 16 by reconnecting the hydraulic ram 94 between the brackets 95,99 (FIGS. 3–5) and retracting the ram's piston rod to move the bracket 99 and the setting ring 77 radially upward and the cam surface 77b away from the locking ring 89. The locking ring 89 moves radially inward, due to the spring bias of the ring, and unlocks the mandrel 41 from the outer connecting member 16. The upward movement of the setting ring 77 also relieves the pressure on the packing rings 63,64 and allows these rings to expand axially and contract radially away from the inner wall of the outer member 16, whereby the inner member 12 can be easily moved out of the outer member 16.

The present invention provides a subsea pipe connector that can tolerate misalignment of the inner and outer members and minor imperfections in the surface of the connecting members due to the use of resilient expandable sealing members. Two lengths of pipe can be releasably connected using a minimum of diver assistance. A hydraulic ram can be used to lock the inner and outer members together, and to expand the sealing members to provide fluid-tight seals between the inner and outer members.

Although the best mode contemplated for carrying out the present invention has been herein shown and described, it will be apparent that modification and variation may be made without departing from what is regarded to be the subject matter of the invention.

What is claimed is:

1. A subsea connector for releasably connecting two lengths of pipe, said connector comprising:
   a generally cylindrical inner member having a bore extending axially from one end thereof through a portion of said inner member, said inner member having at least one port extending from said bore radially through a wall to the outside of said inner member;
   means for connecting said first length of pipe to communicate with said axial bore of said inner member;
   a generally cylindrical outer member having an axially extending passage to receive said inner member, said outer member having first and second annular grooves in an inner wall thereof, said first groove being adjacent said radial port of said inner member when said inner member is operatively positioned in said axial passage of said outer member, said outer member having a passage extending radially outward from said first annular groove through a wall to the outside of said outer member;
   means for connecting a second length of pipe to the outside of said wall of said outer member with said second pipe communicating with said radial passage in said wall of said outer member;
   first and second annular sealing means mounted between said inner wall of said outer member and an outer wall of said inner member with said first sealing means mounted between said first groove and a first end of said outer member and said second sealing means mounted between said first groove and a second end of said outer member to facilitate the transfer of fluid from said axial bore of said inner member through said radial port and said groove to said radial passage of said outer member;
   an annular locking ring mounted around said inner member, said locking ring being biased radially inward;
   an annular setting ring mounted adjacent said locking ring, said setting ring having a cam surface for expanding said locking ring radially outward into a portion of said second groove in said outer member upon axial movement of said setting ring to lock said inner member in operating position inside said axial passage of said outer member; and
   a hydraulic ram connected between said inner member and said setting ring to provide axial movement of said setting ring.

2. A connector as defined in claim 1 including means for selectively expanding said first and said second sealing means in a radial direction to form a fluid-tight seal between said inner and said outer members.

3. A connector as defined in claim 1 including power means for moving said inner member into an operating position in said axial passage of said outer member.

4. A connector as defined in claim 1 wherein operation of said hydraulic ram selectively secures said inner member in position inside said axial passage of said outer member and expands said first and said second sealing means in a radial direction to form a fluid-tight seal between said inner and said outer members.

5. A subsea connector as defined in claim 1 including means for mounting said first and second sealing means in spaced relation about said outer wall of said inner member, said first and said second sealing means being biased radially inward to facilitate movement of said sealing means and said inner member into said axial passage of said outer member.

6. A subsea connector as defined in claim 5 including means for expanding said first and said second sealing means in a radial direction to provide fluid-tight seals between said inner and said outer members when said inner member is in operating position inside said axial passage of said outer member.

7. A subsea connector as defined in claim 5 including ratchet means for expanding said first and said second sealing means in a radial direction to provide fluid-tight seals between said inner and said outer members when said inner member is in operating position inside said axial passage of said outer member, and means for connecting said hydraulic ram between said ratchet means and said inner member to operate said ratchet means.

8. A subsea connector for releasably connecting two lengths of pipe, said connector comprising:
- a generally cylindrical inner member having a bore extending axially from one end thereof through a portion of said inner member, said inner member having at least one port extending from said bore radially through a wall to the outside of said inner member;
- an annular locking ring mounted around said inner member, said locking ring being biased radially inward about said inner member;
- a generally cylindrical outer member having an axially extending passage to receive said inner member, said outer member having first and second annular grooves in an inner wall thereof, said second annular groove being adjacent said locking ring when said inner member is operatively positioned in said axial passage of said outer member and said first annular groove is adjacent said radial port of said inner member, said outer member having a passage extending radially outward from said first annular groove through a wall to the outside of said outer member;
- a setting ring for moving said locking ring radially outward in response to an axial movement of said setting ring to move a portion of said locking ring into said second annular groove to lock said inner member to said outer member when said inner member is operatively positioned in said axial passage of said outer member;
- hydraulic power means connected between said inner member and said setting ring to provide axial movement of said setting ring; and
- first and second annular resilient sealing means mounted between said inner wall of said outer member and said outer wall of said inner member with said first sealing means mounted between said first groove and a first end of said outer member and said second sealing means mounted between said first groove and a second end of said outer member to facilitate the transfer of fluid from said axial bore of said inner member through said radial port and said first groove to said radial passage of said outer member.

9. A subsea connector as defined in claim 8 including means for selectively expanding said first and said second sealing means in a radial direction to form a fluid-tight seal between said inner and said outer members.

10. A subsea connector as defined in claim 9 including a generally cylindrical lantern ring mounted around said inner member between said first and said second resilient sealing means, said lantern ring having a plurality of spaced radially extending ports in a wall thereof, a generally cylindrical skirt mounted between said first sealing means and a first end of said inner member, a generally cylindrical hollow actuator mounted between said second sealing means and a second end of said inner member, said hydraulic power means forcing said actuator axially against said second resilient sealing means to axially compress said sealing means between said actuator and a first end of said lantern ring and to force said lantern ring against said first sealing means to axially compress said first resilient sealing means between said lantern ring and said cylindrical skirt, said first and second axially compressed sealing means expanding radially to form a pair of fluid-tight seals between said inner and said outer members.

* * * * *